UNITED STATES PATENT OFFICE.

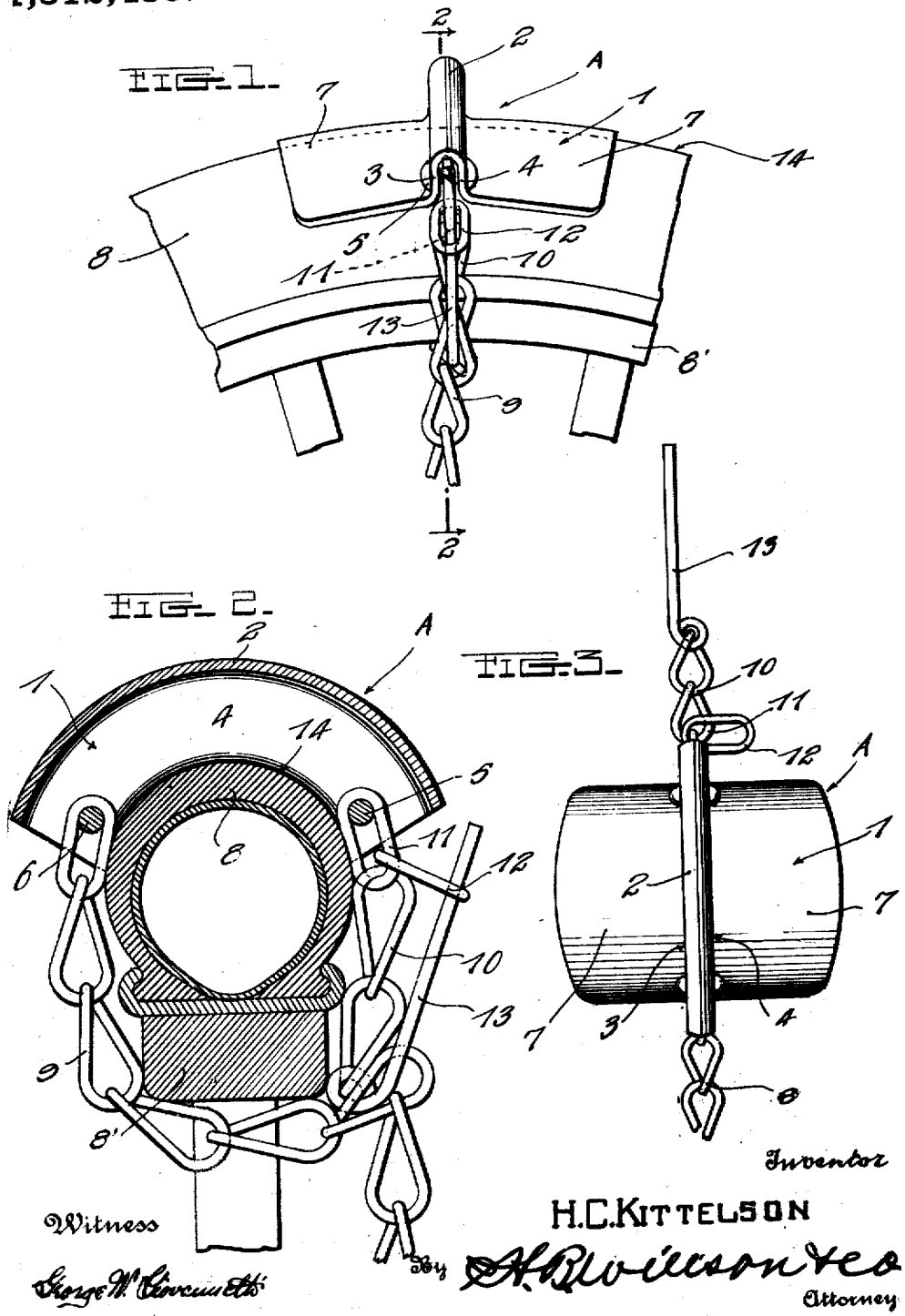

HALMER C. KITTELSON, OF MINNEAPOLIS, MINNESOTA, ASSIGNOR TO PRESSED STEEL AUTOMOBILE LUG COMPANY, INC., OF MINNEAPOLIS, MINNESOTA.

MUD-LUG FOR AUTOMOBILE-TIRES.

1,312,483.   Specification of Letters Patent.   Patented Aug. 5, 1919.

Application filed April 19, 1917. Serial No. 163,279.

*To all whom it may concern:*

Be it known that I, HALMER C. KITTELSON, a citizen of the United States, residing at Minneapolis, in the county of Hennepin and State of Minnesota, have invented certain new and useful Improvements in Mud-Lugs for Automobile-Tires; and I do declare the following to be a full, clear, and exact description of the invention, such as will enable others skilled in the art to which it appertains to make and use the same.

This invention relates to improvements in mud lugs for automobile tires, and more particularly to that type which is detachable.

One object of my invention is to provide a mud lug formed of a single sheet of metal having the central portion folded upon itself and extending outwardly and transversely to form a tranverse rib, and means carried by said sheet which may be readily attached to a tire and detached therefrom.

Another object of my invention is to provide a mud lug for an automobile tire which will be simple and durable, also which will be inexpensive to manufacture.

With these and other objects in view, the invention consists of certain novel features of construction, and the combination and arrangement of parts as will be more fully described and claimed.

In the acompanying drawings:—

Figure 1 is a side elevation of my device as applied to a wheel;

Fig. 2 is a vertical section on the line 2—2 of Fig. 1;

Fig. 3 is a top plan view of my device detached.

In carrying out my invention, I employ a lug A formed of a single sheet of metal 1 which has its central portion folded upon itself and extends outwardly and transversely to form a transverse rib 2. The walls of rib 2 are of a sufficient height to provide a relatively large vertical surface for gripping sand or soft mud. The rib 2 projects at approximately right angles from the plate and has its walls 3 and 4 spaced apart. Rivets 5 and 6 are passed through said walls 3 and 4 near the ends of the rib 2. The remaining portions of the sheet 1 are curved transversely as at 7 to conform to the shape of the tire 8.

A chain 9 is attached to the rivet 6 and has its inner link positioned between the walls 3 and 4 of the rib 2. A second chain 10 has its second link 11 attached to the rivet 5 and is positioned between the walls 3 and 4 of the rib 2, while the first link 12 of the chain 10 extends laterally to the side. On the end of the chain 10 is a pin 13 which engages the link 12 when the lug A is in locked position about the tire 8.

In operation, the lug A is placed about the tire 8 so that the outer face 14 of the tire 8 will engage the transversely curved end portions 7 of the sheet 1. The chain 9 is brought up under the tire 8 and felly 8', and the pin 13 is inserted through one of the links of the chain 9 and forced backward, until the link 12 engages the outer end of said pin 13. This will lock the lug A firmly about the tire 8. It is evident that there will be no binding of the parts about the tire when the lug is in position, as there is in most all other detachable mud lugs.

It will be noted that my device is much simpler in construction than other devices of its kind, as the body portion or sheet is stamped out of a single piece of metal, thus necessitating the minimum amount of labor. The manner in which the chains are placed in position insures a tight and permanent connection which cannot be broken or come loose while the lub is in position. The fact that the lug is of one piece of metal and is constructed as described, shows that it will be of very light material and will be easy to carry a set in the tool box of an automobile.

Various changes in the form, proportion and the minor details of construction may be resorted to without departing from the principle or sacrificing any of the advantages of the claimed invention.

I claim:—

1. A mud lug formed of a sheet of metal having its central portion folded upon itself transversely, said fold extending outwardly at approximately right angles to form a transverse rib, said rib being of a sufficient height to provide a relatively large side surface for gripping sand or mud, the outer periphery of said rib extending across the tread surface of the tire, the remaining portions of said sheet being curved to conform to the shape of the tire, the walls of said rib being spaced apart, rivets passed through said walls near their outer ends, and means carried by said rivets and arranged within the walls of said rib for securing the lug in position.

2. A traction lug comprising a base adapted to fit onto a tire and having a radially and transversely disposed lug proper, the ends of which extend materially beyond the sides of the tire, said lug proper being U-shaped in cross section, and means extending between the side walls of the lug proper outward of the sides of the tire and attached thereto for securing the traction lug on the tire.

In testimony whereof I have hereunto set my hand in the presence of two subscribing witnesses.

HALMER C. KITTELSON.

Witnesses:
 M. H. STUARD,
 S. A. HABERMAN.